(12) United States Patent
Zhang

(10) Patent No.: US 10,086,332 B2
(45) Date of Patent: Oct. 2, 2018

(54) EXHAUST FLOW DEVICE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 586 days.

(21) Appl. No.: 14/706,650

(22) Filed: May 7, 2015

(65) Prior Publication Data

US 2016/0326938 A1    Nov. 10, 2016

(51) Int. Cl.
| | | |
|---|---|---|
| *F01N 13/08* | (2010.01) |
| *B01F 3/04* | (2006.01) |
| *B01D 53/94* | (2006.01) |
| *B01F 5/06* | (2006.01) |
| *B01F 5/04* | (2006.01) |
| *F01N 3/20* | (2006.01) |
| *F01N 3/28* | (2006.01) |

(52) U.S. Cl.
CPC .......... *B01D 53/94* (2013.01); *B01F 3/04049* (2013.01); *B01F 5/0473* (2013.01); *B01F 5/064* (2013.01); *F01N 3/2066* (2013.01); *F01N 3/2892* (2013.01); *Y02T 10/24* (2013.01)

(58) Field of Classification Search
CPC ..................................................... F01N 3/2892
USPC .................................................. 366/336–340
See application file for complete search history.

(56) References Cited

U.S. PATENT DOCUMENTS

| | | | |
|---|---|---|---|
| 1,262,317 A * | 4/1918 | Finney ..................... | F02M 1/00 |
| | | | 123/590 |
| 4,487,017 A | 12/1984 | Rodgers | |
| 5,145,256 A * | 9/1992 | Wiemers ................. | B01F 5/061 |
| | | | 137/808 |
| 5,492,408 A | 2/1996 | Alfaré | |
| 6,016,651 A | 1/2000 | Hammond et al. | |
| 6,074,619 A | 6/2000 | Schoubye | |
| 7,032,578 B2 | 4/2006 | Liu et al. | |
| 7,225,623 B2 | 6/2007 | Koshoffer | |
| 7,469,529 B2 | 12/2008 | Feuillard et al. | |
| 7,581,387 B2 | 9/2009 | Bui et al. | |
| 8,061,890 B2 | 11/2011 | Suhner | |
| 8,151,556 B2 | 4/2012 | Oriet et al. | |
| 2002/0110047 A1* | 8/2002 | Bruck ..................... | B01F 5/061 |
| | | | 366/340 |
| 2010/0005787 A1 | 1/2010 | Hosoya et al. | |
| 2011/0036082 A1 | 2/2011 | Collinot | |
| 2012/0204541 A1 | 8/2012 | Li et al. | |

OTHER PUBLICATIONS

Zhang, Xiaogang, "Exhaust Gas Mixer," U.S. Appl. No. 14/823,700, filed Aug. 11, 2015, 47 pages.
Zhang, Xiaogang, "Exhaust Gas Mixer," U.S. Appl. No. 14/943,620, filed Nov. 17, 2015, 45 pages.
Zhang, Xiaogang, "System for a Urea Mixer," U.S. Appl. No. 14/945,122, filed Nov. 18, 2015, 30 pages.
Zhang, Xiaogang, "Particulate Matter Sensor," U.S. Appl. No. 15/018,637, filed Feb. 8, 2016, 40 pages.

\* cited by examiner

*Primary Examiner* — Tony G Soohoo
*Assistant Examiner* — Elizabeth Insler
(74) *Attorney, Agent, or Firm* — Julia Voutyras; McCoy Russell LLP

(57) ABSTRACT

Methods and systems are provided for a mixer. In one example, a system may include a mixer with three separate portions, each portion comprising a plurality of misaligned perforations.

18 Claims, 10 Drawing Sheets

EXHAUST FLOW DEVICE

FIELD

The present description relates generally to systems for a mixing device.

BACKGROUND/SUMMARY

One technology for after-treatment of engine exhaust utilizes selective catalytic reduction (SCR) to enable certain chemical reactions to occur between NOx in the exhaust and ammonia (NH). $NH_3$ is introduced into an engine exhaust system upstream of an SCR catalyst by injecting urea into an exhaust pathway. The urea entropically decomposes to $NH_3$ under high temperature conditions. The SCR facilitates the reaction between $NH_3$ and NOx to convert NOx into nitrogen ($N_2$) and water ($H_2O$), two constituents found in abundance in earth's atmosphere. However, issues may arise upon injecting urea into the exhaust pathway. In one example, urea may be poorly mixed into the exhaust flow (e.g., a first portion of exhaust flow has a higher concentration of urea than a second portion of exhaust flow) which may lead to poor coating of the SCR and poor reactivity between pollutants $NO_x$) and the SCR.

Attempts to address poor mixing include introducing a mixing device downstream of a urea injector and upstream of the SCR such that the exhaust flow may be homogenous. One example approach is shown by Collinot et al. in U.S. 20110036082. Therein, an exhaust mixer is introduced to an exhaust pathway to both reduce exhaust backpressure as exhaust flows though the mixer and increase exhaust homogeneity. The exhaust mixer comprises one or more helicoids which may manipulate an exhaust flow to flow within an angular range of 0 to 30°.

However, the inventors herein have recognized potential issues with such systems. As one example, the mixer introduced by Collinot has a relatively long body and may additionally comprise one or more mixer bodies adjacent to one another. The mixer bodies may vibrate and collide with one another, due to either road conditions or turbulent exhaust flow, which may produce undesired audible sounds and/or prematurely degrade the mixer.

In one example, the issues described above may be addressed by a system for an exhaust gas mixer comprising an upstream and downstream section, each having a perforated annular plate angled downstream in an inward direction and a perforated upstream facing cone vertically aligned with the annular plate. The exhaust gas mixer further comprises a central section between the upstream and downstream section having a perforated annular ring of triangular cross-section.

In this way, it is possible to achieve improved mixing by taking advantage of more normal/binomial distribution of flow that presents numerous points at which the flow can take different paths, similar to a Galton box or quincunx device.

As an example, a mixer with a first outer portion and a substantially identical second outer portion spatially surround a middle portion, may be used to increase a homogeneity of an exhaust gas. The portions are complementary to one another such that an exhaust flow is altered as it passes through each portion of the mixer. The first outer portion, middle portion, and second outer portion are physically coupled to a mixer pipe, but not physically coupled to one another. Furthermore, the mixer is compact, which may increases a mixer stability along with allowing the mixer to be placed in a greater number of locations. In this way, the mixer may not produce audible sounds due to exhaust turbulence of engine load.

In still another example, a mixer pipe with three portions where a first portion and third portion comprise outer and inner perforations. The outer perforations are radially misaligned with the inner perforations. A second portion comprising peripheral and central perforations are axially misaligned with the outer and inner perforations respectively. The peripheral and central perforations are radially misaligned with one another.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
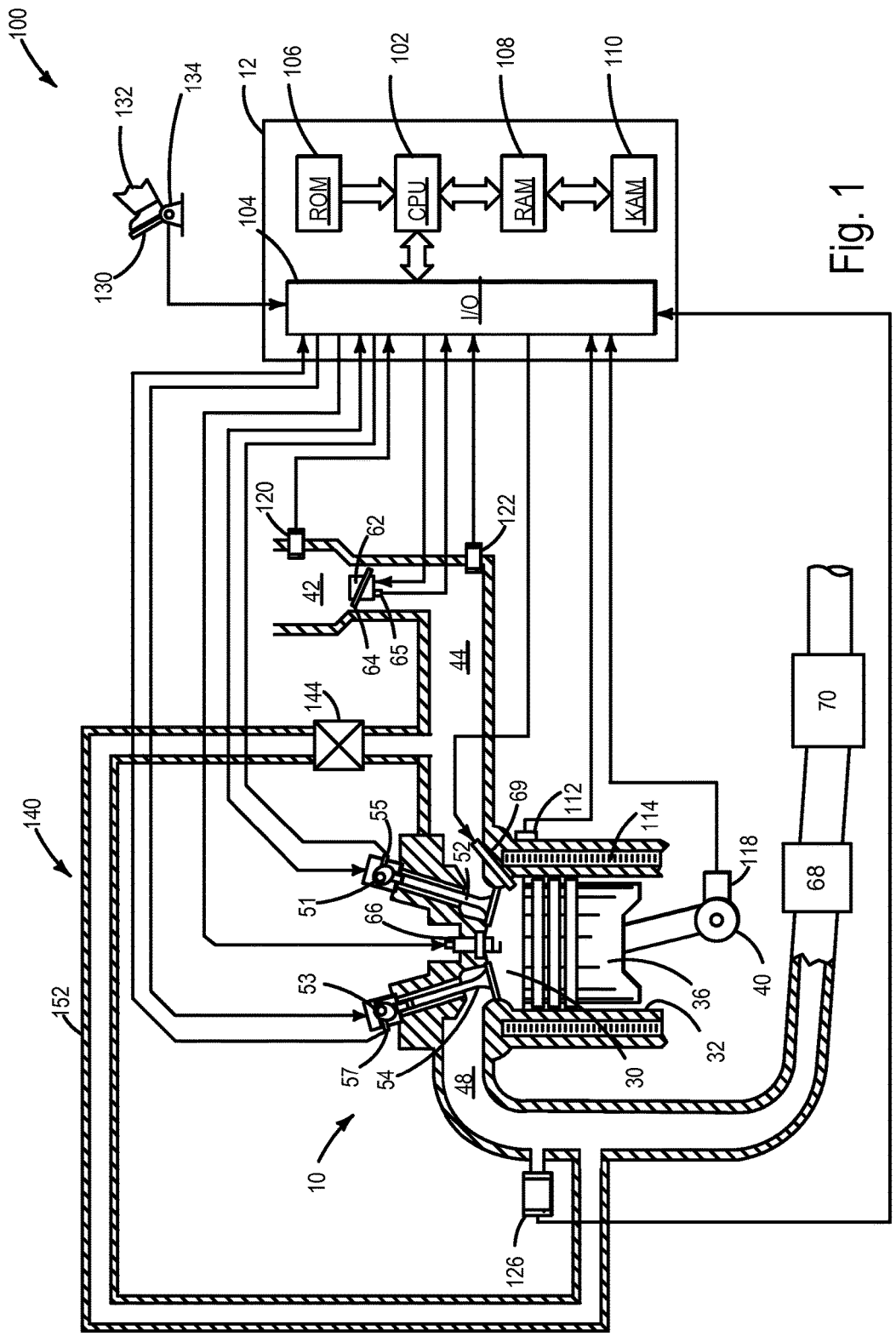
FIG. 1 illustrates an example cylinder of an engine.
Figure 2:
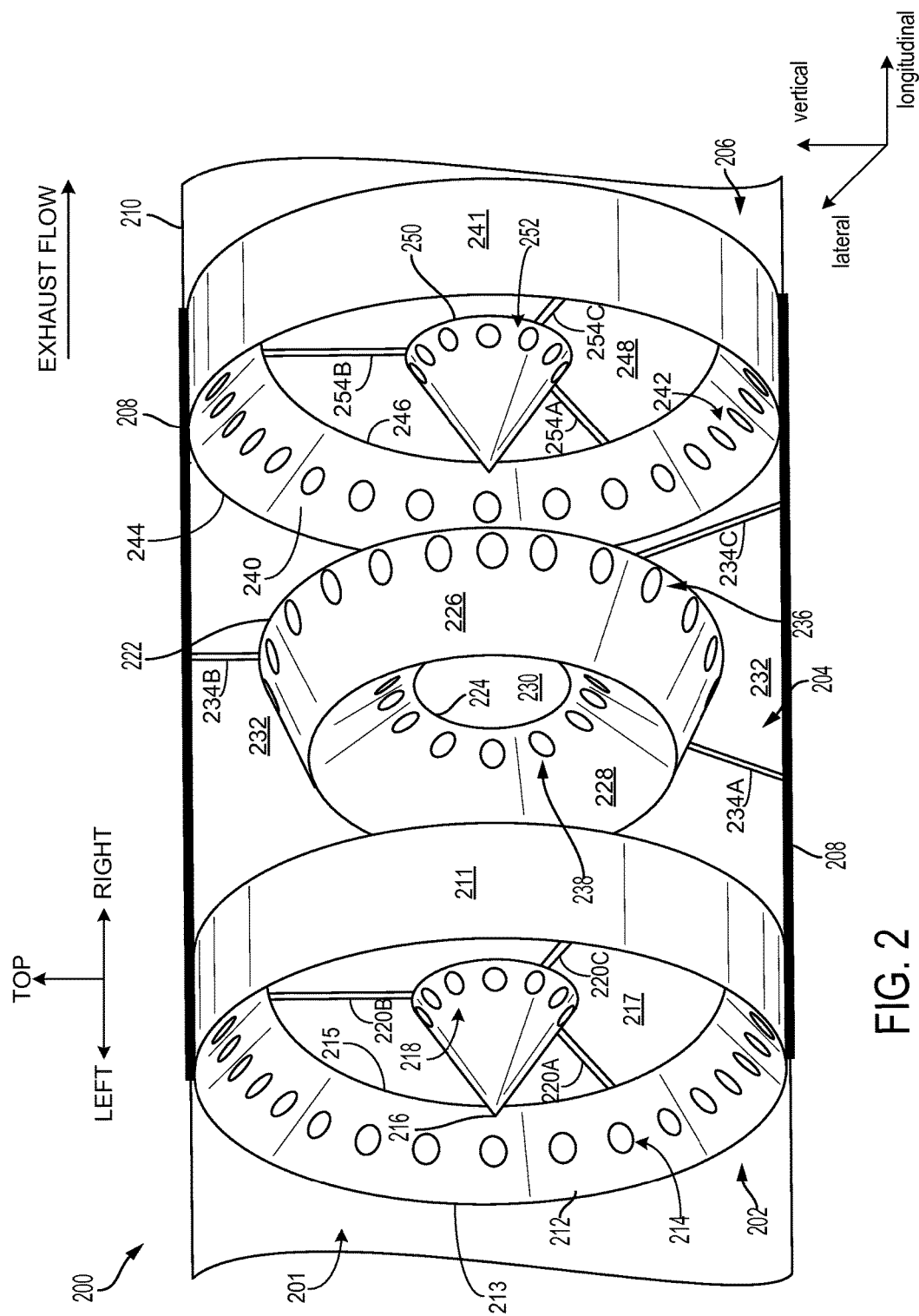
FIG. 2 illustrates a mixer.
Figure 6:
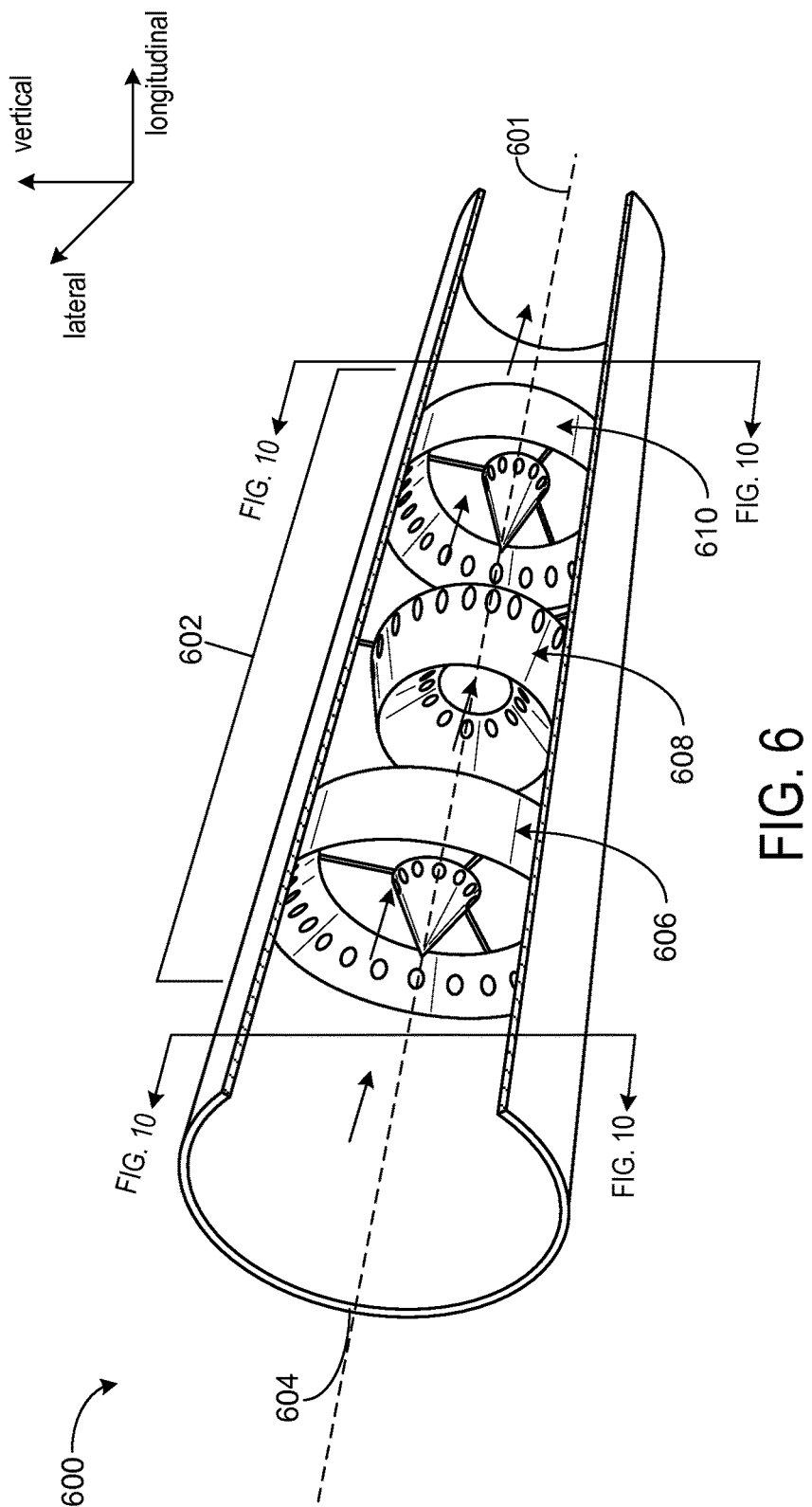
FIG. 6 illustrates a cross-section of an exhaust conduit comprising the mixer.
Figure 7:
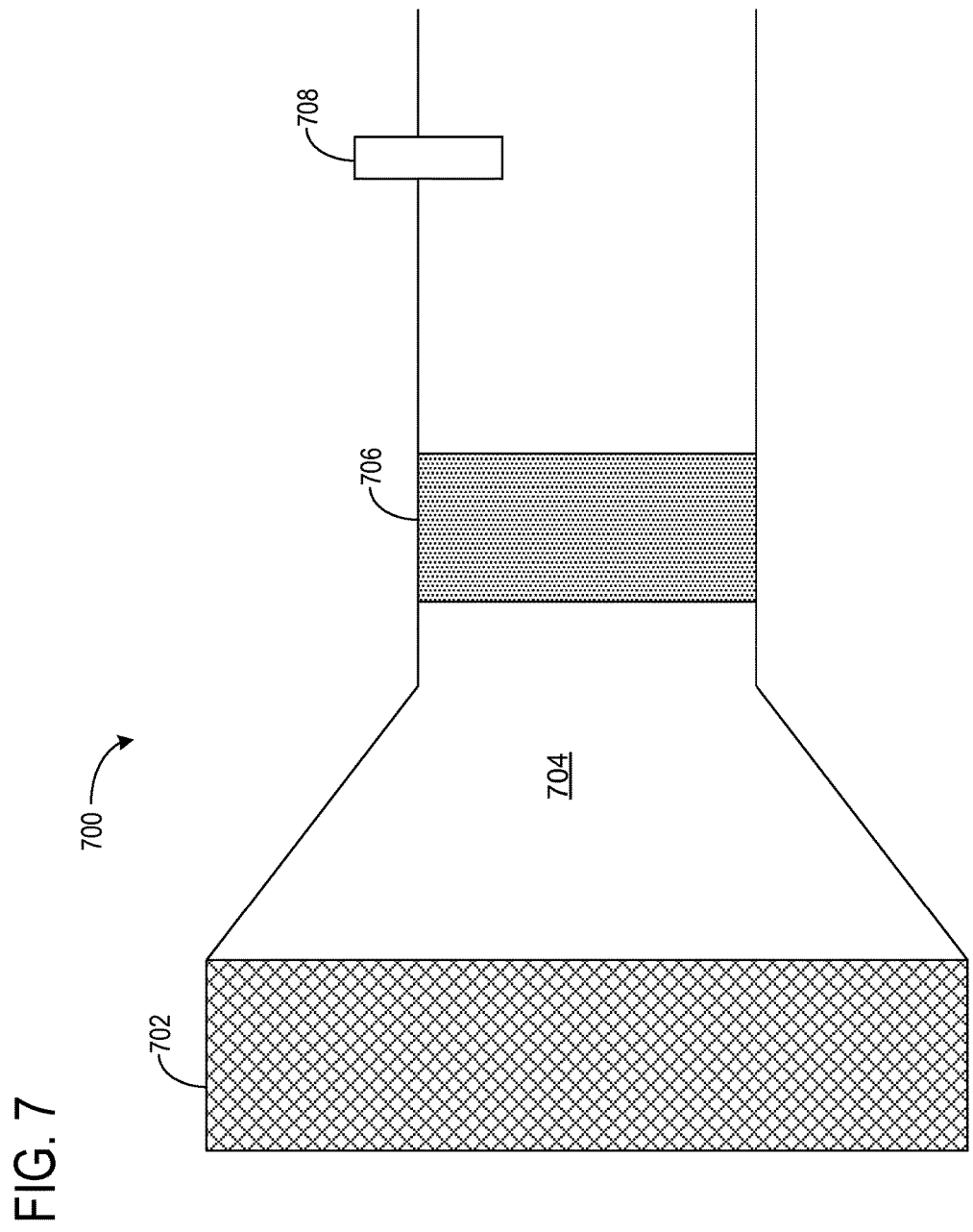
FIG. 7 illustrates an embodiment including the mixer downstream of a particulate filter.
Figure 8:
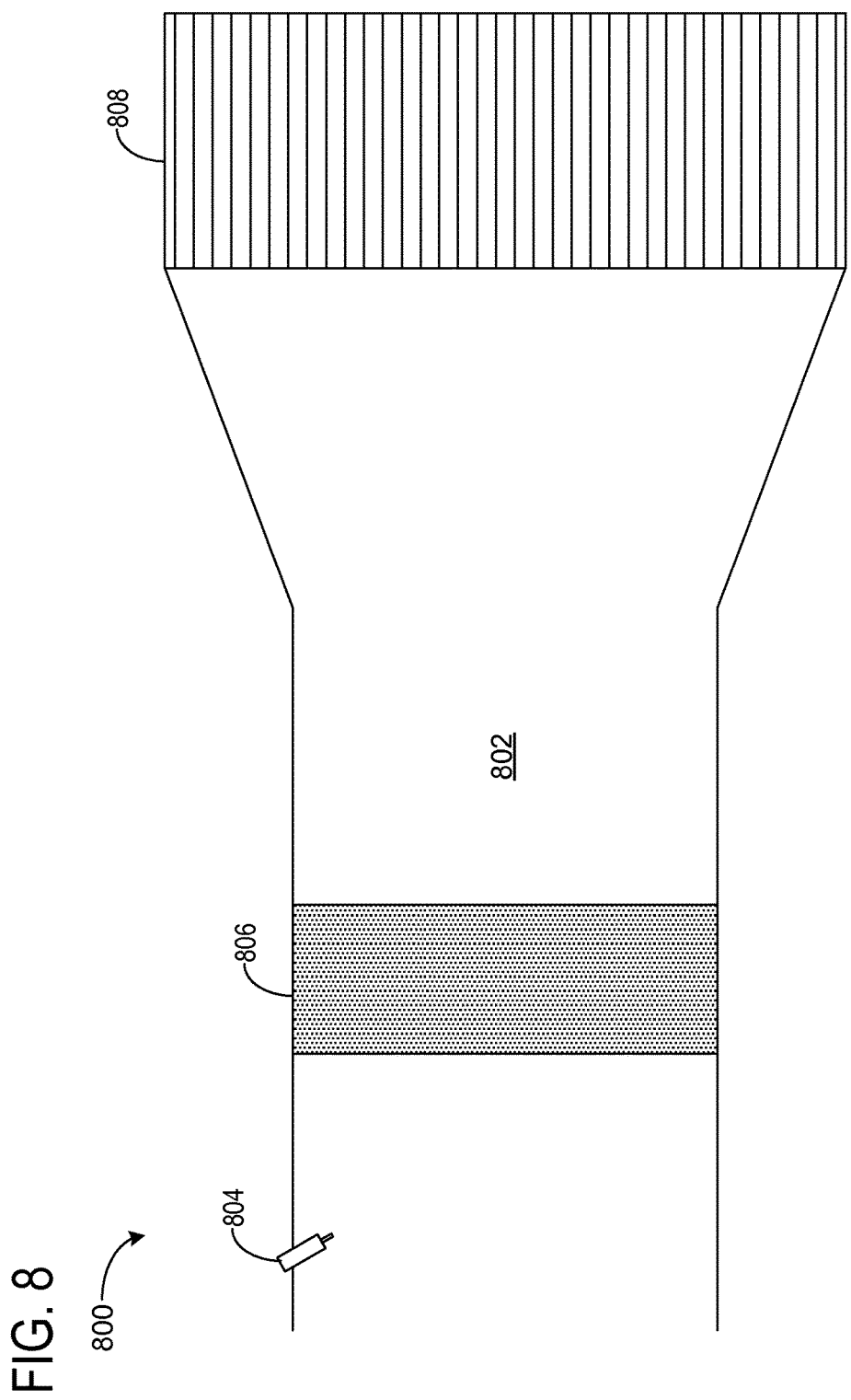
FIG. 8 illustrates an embodiment with the mixer downstream of a urea injector.
Figure 9:
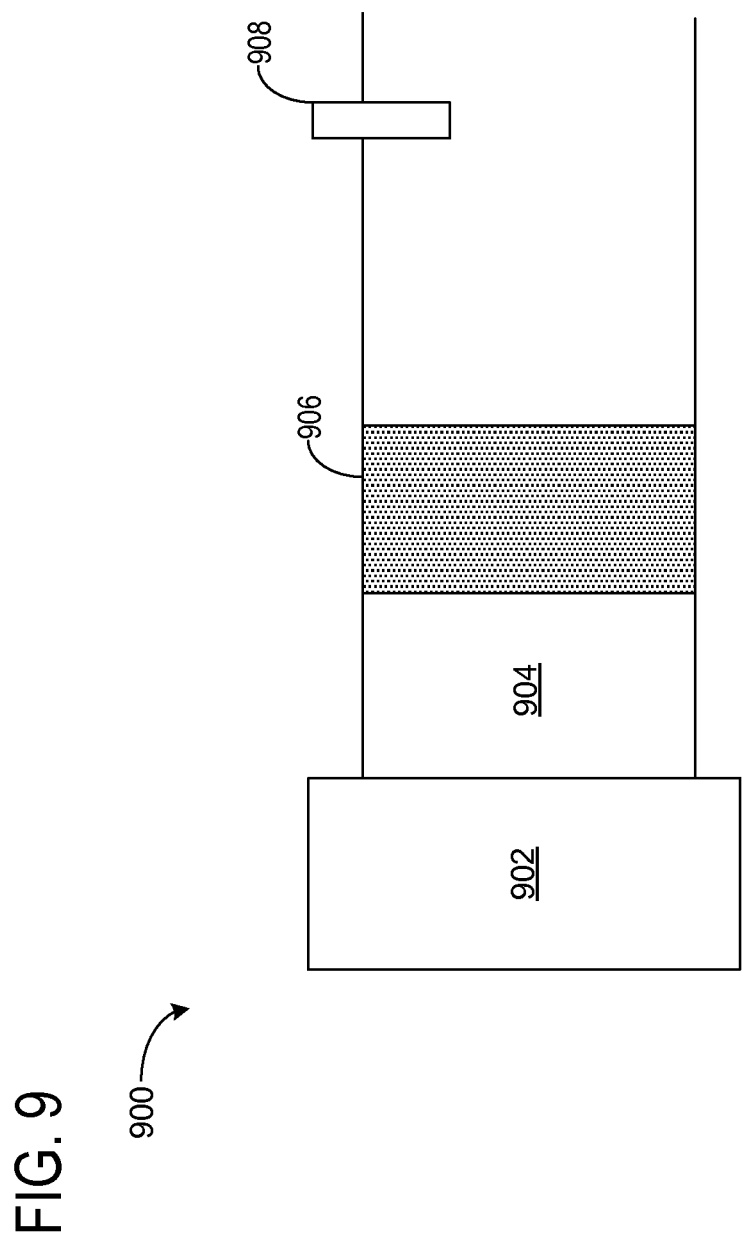
FIG. 9 illustrates an embodiment depicting the mixer upstream of a gas sensor.

The following description relates to systems and methods for a mixer located in an exhaust conduit of a vehicle. The vehicle comprises an engine capable of impelling a vehicle via combustion, as shown in FIG. 1. A product of combustion is exhaust gas, which comprises a variety of constituents. Also shown in FIG. 1, are various sensors, actuators, and treatment devices used to measure or interact with the exhaust gas. In order to obtain accurate measurements of a composition of the exhaust gas, it is desired to increase a homogeneity of the exhaust gas. The mixer depicted in FIG. 2 is capable of perturbing an exhaust flow such that a homogeneity of the exhaust gas is increased. A side-on view of a first stage and second stage of the mixer is shown with respect to FIGS. 3A and 3B. A face-on view of the first stage and the second stage of the mixer is shown with respect to FIGS. 4A and 4B. Considering gases move at incredible speeds and are continuously colliding with one another, one example of an exhaust gas flow through the mixer is shown with respect to FIG. 5. However, other example flows may exist. A cross-section of the mixer in an exhaust conduit is shown with respect to FIG. 6. The mixer may be located downstream of a particulate filter, downstream of a urea injector and upstream of a selective catalytic reductant (SCR), and upstream of an exhaust gas sensor, as shown in FIGS. 7, 8, and 9, respectively.

It will be appreciated that FIGS. 2, 3, 4, and 6 are drawn approximately to scale, although other relative dimensions may be used, if desired.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of both the exhaust gas sensor 126 and a mixer 68. The device 70 may be a three way catalyst (TWC), $NO_x$ trap, selective catalytic reductant (SCR), various other emission control devices, or combinations thereof. In some examples, during operation of the engine 10, the emission control device 70 may be periodically reset by operating at least one cylinder of the engine within a particular air-fuel ratio.

The mixer 68 is shown upstream of the emission control device 70 and downstream of the exhaust gas sensor 126. In some embodiments, additionally or alternatively, a second exhaust gas sensor may be located between the mixer 68 and the emission control device 70. The mixer 68 comprises multiple sections, for example two or more sections and in one example exactly three sections, cascaded along an exhaust flow direction in the exhaust passage 48. The sections have a plurality of perforations, where respective perforations of adjacent sections may be concentrically misaligned. In this way, the mixer 68 may perturb an exhaust flow such that a homogeneity of an exhaust gas mixture is increased as the exhaust gas flows through the mixer 68. The mixer 68 will be described in further detail below.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

FIG. 1 depicts an example system comprising a mixer. The mixer comprises three stages. A first stage and third stage are substantially identical in size and shape. The first and third stages comprise an outer annulus and a central cone. The outer annuli are in face sharing contact with an outer mixer pipe. A flow space separates the outer annulus from the central cone. Supports are physically coupled to the outer annulus and the cone. The supports hold the cone in the center of the mixer. A second stage is located directly downstream of the first stage and upstream of the third stage. A gap exists between the second stage and the outer mixer pipe. Three legs are physically coupled to the outer mixer pipe and the second stage in order to hold the second stage in place. The gap is located directly downstream of the outer annulus of the first stage. A hole is located in the middle of the second stage directly downstream of the cone of the first stage. Furthermore, each of the first stage, the second stage, and third stage comprise perforations, where the perforations are concentrically misaligned with an adjacent stage. In this way, the stages of the mixer are staggered such that an exhaust gas flowing through the mixer has an increased likelihood of mixing compared to exhaust gas flowing through an exhaust conduit without the mixer. The mixer will be described in greater detail below.

Figure 3A:
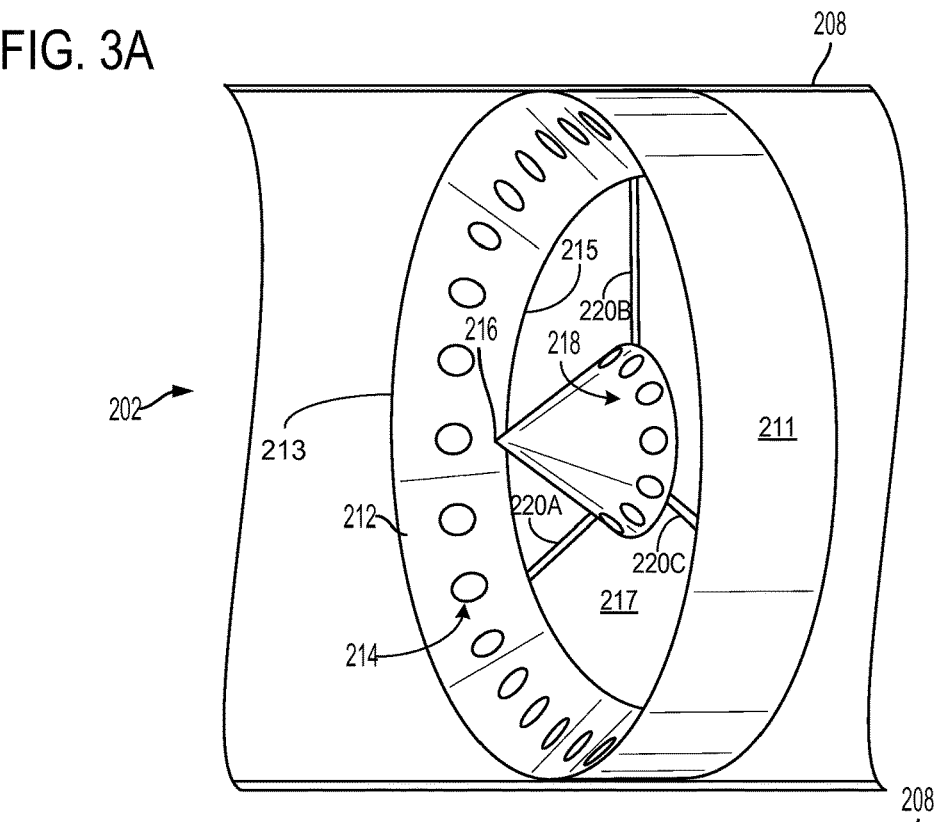
FIGS. 3A and 3B illustrate a cross sectional view of both a first and second outer mixer components of the exhaust gas mixer and an interior mixer component of the mixer, respectively.
Figure 3B:
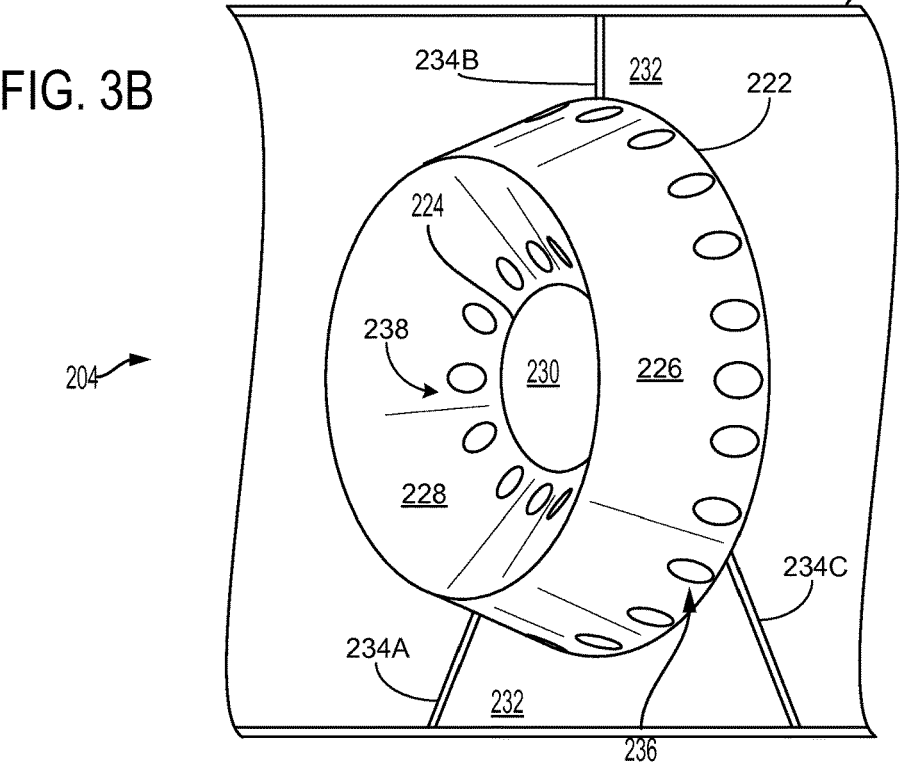
Figure 4B:
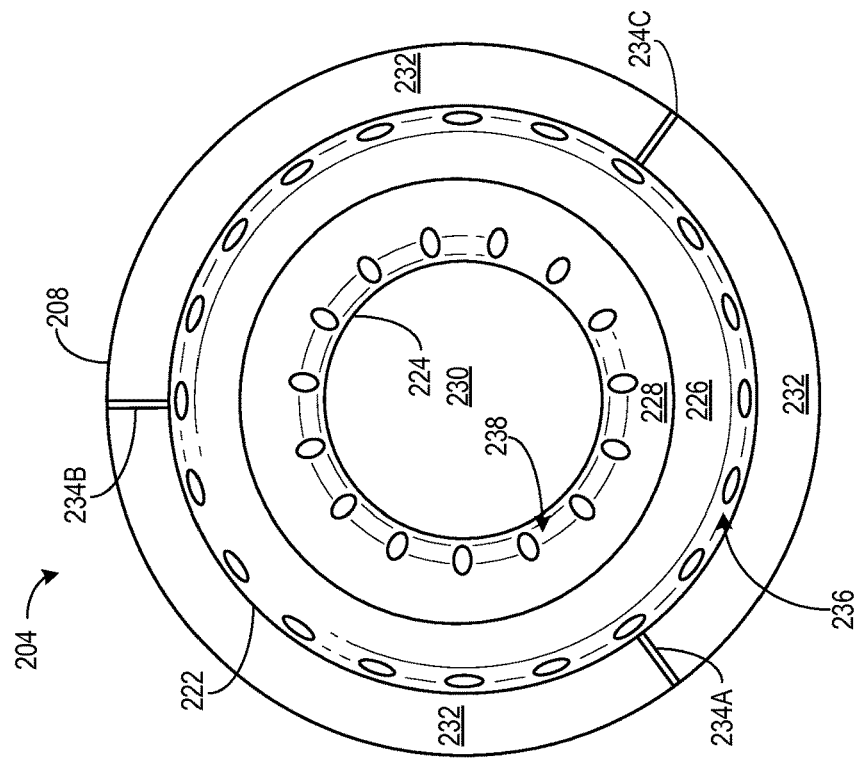
FIGS. 4A and 4B illustrate a front view of both the outer mixer components and the interior mixer component of the mixer, respectively.
Figure 4A:
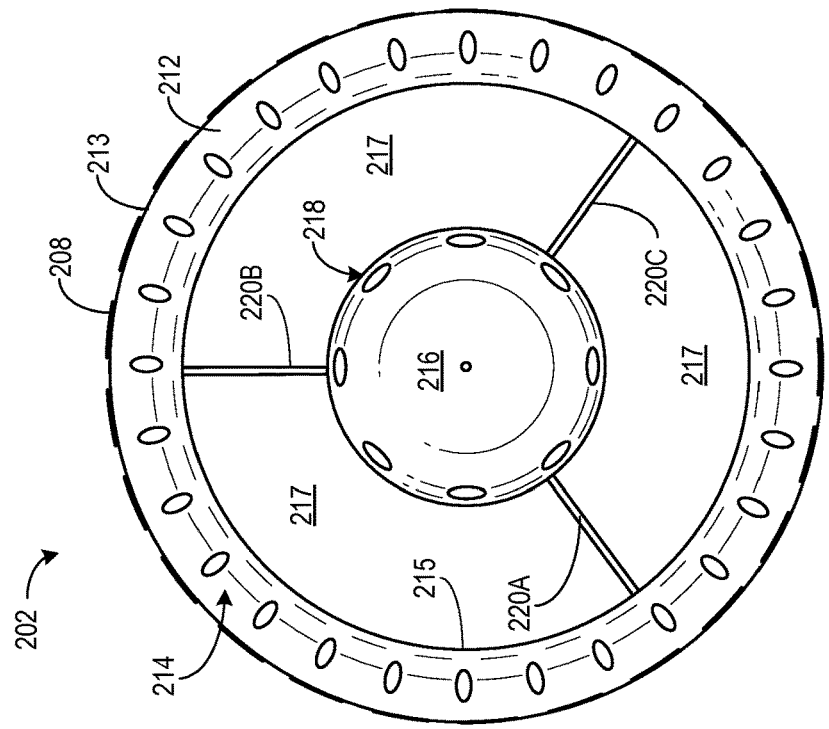

Detailed depictions of the above described mixer are illustrated in FIGS. 2, 3A and 3B, and 4A and 4B. FIG. 2 depicts an isometric view of the mixer, FIGS. 3A and 3B depict cross-sectional views of individual components of the mixer, and FIGS. 4A and 4B depict face-on views of the individual components of the mixer.

A system 200 comprises a mixer 201. The mixer 201 comprises three sections cascaded along an exhaust flow direction in an exhaust passage and having a plurality of perforations, where respective perforations of adjacent sections are concentrically misaligned. The mixer 201 may be substantially similar to mixer 68 and may be used in the embodiment depicted with respect to FIG. 1.

The mixer 201 may be a single machined piece. The mixer 201 may comprise of one or more of a ceramic material, a metal alloy, a silicon derivative, or other suitable materials capable of withstanding high temperatures. Additionally or alternatively, the mixer 201 may comprise of one or more coatings and materials such that exhaust may contact surfaces of the mixer 201 without depositing soot on the mixer 201.

Mixer 201 comprises a first outer mixer component 202, an interior mixer component 204, and a second outer mixer component 206. The first outer mixer component 202 is upstream of the interior mixer component 204. The second outer mixer component 206 is downstream of the interior mixer component 204. In other words, the internal mixer component 204 is spatially sandwiched by the first outer mixer component 202 and the second outer mixer component 206. The first outer mixer component 202 and second outer mixer component 206 are substantially identical in size, shape, and function.

The first outer mixer component 202 the interior mixer component 204, and the second outer mixer component 206 are housed within and physically coupled to an outer pipe 208, as indicated by a thick line. An entirety of the circumference of the outer pipe 208 is physically coupled to and in face-sharing contact with a portion of an exhaust conduit 210 (e.g., exhaust passage 48), as indicated by a thinner line. The outer pipe 208 is hermetically sealed to the exhaust conduit 210 such that neither gas nor fluid may pass between the outer pipe 208 and the exhaust conduit 210. The outer pipe 208 may be sealed to the exhaust conduit 210 via an adhesive or forcibly slid into the exhaust conduit.

Exhaust gas flowing through the exhaust conduit 210 initially interacts with the first outer mixer component 202 of the mixer 201. The first outer mixer component 202 disrupts exhaust flow in order to increase a likelihood of separate exhaust constituents mixing. The exhaust gas flows through various orifices of the first outer mixer component 202 before flowing to the internal mixer component 204, and the second outer mixer component 206. The interior mixer component 204 and second outer mixer component 206 further manipulate exhaust flow to further increase the likelihood of exhaust gas mixing. An example path of exhaust flow through the mixer 201 will be discussed in greater detail with respect to FIG. 5.

The first outer mixer component 202 comprises an outer annulus 212. The outer annulus 212 comprises a wall 211. An entirety of the wall 211 is in face-sharing contact with the outer pipe 208. The wall 211 and the outer pipe 208 are hermetically sealed together such that a gas or a fluid may not pass through the seal.

The outer annulus 212 is beveled. The bevel extends from an outer diameter 213 and an inner diameter 215. The bevel is angled such that it is directed toward a cone 216 and/or flow space 217 located in a more central area of the exhaust conduit 210. In other words, the bevel is designed such that the outer annulus 212 is concave. The bevel may direct exhaust gas flow toward a flow space 217 and/or a cone 216.

The outer annulus 212 may be a single machined sheet of any of the suitable materials listed above. Thus, wall 211 and the bevel adjoin only at an outer diameter 213. Therefore, an inner diameter 215 and a base of the wall 211 nearest the internal mixer component 204 are not physically coupled. In other words, the single machined sheet may be bent at the outer diameter 213 in order to shape the bevel and the wall 211, without creating a base.

The outer annulus 212 further comprises outer perforations 214. The outer perforations 214 traverse an entire thickness of the outer annulus 212. The outer perforations 214 provide a pathway for exhaust gas to flow through an outer periphery of the first outer mixer component 202. As depicted, the outer perforations 214 are elliptical. In some embodiments, additionally or alternatively, the outer perforations 214 may be other suitable shapes.

Flow space 217 is located between the outer annulus 212 and the cone 216. The flow space 217 allows a portion of exhaust gas to flow through the first outer mixer component 202. Exhaust flowing through the flow space 217 may flow through the flow space 217 without interacting with the outer annulus 212 or the cone 216. Alternatively, exhaust flowing through the flow space 217 may have interacted with one or more of the outer annulus 212 or the cone 216.

The cone 216 protrudes through the flow space 217 and lies along a central portion of the first outer mixer component 202. The cone 216 is convex and is therefore directed opposite a direction of exhaust flow. An angle of the cone 216 is opposed to or perpendicular to outer annulus 212. In this way, exhaust gas contacting the outer annulus 212 may flow in a direction opposed to or perpendicular to a direction of exhaust gas contacting the cone 216. Thus, a likelihood of mixing is increased.

The cone 216 comprises inner perforations 218 located proximal to a rim of the bottom of the cone 216. The inner perforations 218 may traverse a corresponding length of the cone 216 such that exhaust flowing through the inner perforations 218 flows through the cone 216. The cone 216 does not comprise a physical base in order to decrease a likelihood of gas being trapped in the cone. Therefore, exhaust flowing through the inner perforations 218 flows downstream of the first outer mixer component 202 without being further altered by the cone 216 or the outer annulus 212. Exhaust flowing through the inner perforations 218 of the cone may mix with exhaust flowing through one or more of the flow space 217 and the outer perforations 214.

The outer perforations 214 and inner perforations 218 may be substantially equal or unequal in size. Additionally or alternatively, the sizes of the outer perforations 214 and inner perforations 218 may alternate such that a portion of the outer perforations 214 and inner perforations 218 are equal in size while a remaining portion of outer perforations 214 and inner perforations 218 are unequal in size. In one embodiment, the outer perforations 214 may greater in size than the inner perforations 218. In this way, a size of a perforation may increase distal to a center of the exhaust conduit 210.

The outer perforations 214 and inner perforations 218 may be radially misaligned in order to increase the likelihood of mixing exhaust constituents. The outer perforations 214 and the inner perforations 218 may be directionally opposed. In one example, exhaust flowing through the outer perforations 214 is opposed to or perpendicular to exhaust flowing through the inner perforations 218.

Legs (e.g., rods) 220A, 220B, and 220C span an entire distance of flow space 217 from the inner diameter 215 to a base of the cone 216. Legs 220A, 220B, and 220C physically couple the outer annulus 212 to the cone 216. Legs 220A, 220B, and 220C may be welded onto the inner diameter 215 and the cone 216. Referring to the axes depicted, leg 220A points to a left wall of the exhaust conduit 210, leg 220B points to a top of the exhaust conduit 210, and leg 220C points to a right of the exhaust conduit 210. Legs 220A, 220B, and 220C will be described in greater detail with respect to FIG. 4A.

Turning to FIG. 4A, a face-on depiction of the first outer mixer component 202 comprising the outer annulus 212, cone 216, and flow space 217 is shown. The outer pipe 208 is represented by dashed lines. The outer annulus 212 is connected to the cone 216 via legs 220A, 220B, and 220C, as described above. The legs 220A, 220B, and 220C are evenly separated by 120° and face left, top, and right directions of the outer pipe 208, respectively. As depicted, the number of outer perforations 214 exceed the number of inner perforations 218. In some embodiments, the number of outer perforations 214 may be equal to the number of inner perforations 218.

Exhaust flowing toward first outer mixer component 202 may only flow through the outer perforations 214, the inner perforations 218, and the flow space 217 in order to flow further downstream of an exhaust conduit. As described above, the internal mixer component 204 is located downstream of the first outer mixer component 202. Exhaust gas flowing through the first outer mixer component 202 flows toward the internal mixer component 204 to be further mixed.

Returning to FIG. 2, the interior mixer component 204 comprises a peripheral diameter 222 and a smaller diameter 224 (e.g., the smaller diameter is the smallest diameter of the interior mixer component 204). The interior mixer component 204 resembles a beveled toroid. More specifically, the interior mixer component 204 further comprises an outer bevel 226 and an inner bevel 228. An angling of the inner bevel 228 is parallel to an angling of the bevel of the outer annulus 212. An angling of the outer bevel 226 is parallel to an angle of the cone 216 and is angled/opposed to the angling of the inner bevel 228.

In one embodiment, an angle between the outer pipe 208 and the outer annulus 212 of the first outer mixer component 202 may be equal to 40°+/−5°. An interior angle of the cone 216 (e.g., an angle created by the tip of the cone 216 facing the interior mixer component 204) of the first outer mixer component 202 may be equal to 60°+/−5°. An angle between the inner bevel 228 and outer bevel 226 of the interior mixer component 204 may be equal to 60°+/−5°. In other words, the angle of the cone 216 and the angle between the inner bevel 228 and the outer bevel 226 may be substantially equal. Furthermore, the angles described for the first outer mixer component may be substantially equal (e.g., within 5°) to angles for the second outer mixer component 206. It will be appreciated by someone skilled in the art that these angles may be altered to other sufficient angles depending on exhaust geometry, structure of the engine, etc.

A top portion of both the outer bevel 226 and the inner bevel 228, at a most upstream portion of the interior mixer component 204, adjoin above a central diameter of the internal mixer component 204. A bottom portion of the outer bevel 226 and inner bevel 228, at a most downstream portion of the interior mixer component 204, do not adjoin (e.g., deviate/move away from one another). Therefore, the outer bevel 226 and the inner bevel 228 are farthest apart at a portion of the interior mixer component 204 (e.g., the base of the interior mixer component) farthest away from the first outer mixer component 202 and nearest to the second outer mixer component 206. In this way, a portion of the internal mixer component 204 nearest the first outer mixer component 202 is thinner than the bottom of the internal mixer component, as depicted.

The smaller diameter 224 surrounds a hole 230 in the middle of the interior mixer component 204. At least a portion of exhaust gas flows through the hole 230. The hole 230 may receive exhaust gas flowing through any one of the components of the first outer mixer component 202.

A flow gap 232 surrounds the peripheral diameter 222 and is located between the peripheral diameter 222 and the outer pipe 208. Legs 234A, 234B, and 234C may be welded to the peripheral diameter 222 and the outer pipe 208. Legs 234A, 234B, and 234C span an entire width of flow gap 232 from the peripheral diameter 222 to the outer pipe 208. Legs 234A, 234B, and 234C are spaced 120° apart from one another and as a result, the flow gap 232 is divided into three substantially equal portions. Leg 234A points toward the left of the exhaust conduit 210, leg 234B points toward the top of the exhaust conduit 210, and leg 234C points toward the right of the exhaust conduit 210 in order to support the internal mixer component 204. At least a portion of exhaust gas flowing through the mixer 201 flows through the flow gap 232.

The internal mixer component 204 further comprises peripheral perforations 236, which are located on the outer bevel 226 proximal to the peripheral diameter 222. Likewise, the inner bevel 228 comprises inner perforations 238 proximal to the smaller diameter 224. Peripheral perforations 236 and inner perforations 238 may be substantially equal or unequal in both size and shape. For example, the peripheral perforations 236 may be larger than the inner perforations 238. The peripheral perforations 236 and the inner perforations 238 may be radially aligned or misaligned. In this way, exhaust gas may be increasingly perturbed which may increase a likelihood of mixing.

Exhaust flowing through the internal mixer component 204 may flow into the outer bevel 226, peripheral perforations 236, inner perforations 238, the inner bevel 228, flow gap 232, hole 230, and legs 234A, 234B, and 234C. All exhaust gas flowing through the internal mixer component 204 passes through only one of the flow gap 232, hole 230, peripheral perforations 236, and inner perforations 238.

Turning now to FIG. 4B, a face-on depiction of the internal mixer component 204 is shown. As depicted, the outer bevel 226 and the inner bevel 228 are substantially equal in width. Legs 234A, 234B, and 234C point in directions parallel to legs 220A, 220B, and 22C, respectively. The peripheral diameter 222 is substantially equal to an inner diameter 215 of the outer annulus 212 of the first outer mixer component 202. The smaller diameter 224 is substantially equal to a largest diameter of the cone 216. A difference between the peripheral diameter 222 and the smaller diameter 224 is substantially equal to a length of the legs 220A, 220B, and 220C. In some embodiments, a diameter of the cone 216 may be greater than the smaller diameter 224. It will be appreciated by someone skilled in the art that the lengths described above may be altered to other suitable lengths such that components of the mixer 201 remain staggered to increase a likelihood of mixing.

The second outer mixer component 206 is identical to the first outer mixer component 202. The structure, size, and location of outer annulus 240, wall 241, outer perforations 242, outer diameter 244, inner diameter 246, flow space 248, cone 250, inner perforations 252, and legs 254A, 254B, and 254C of the second outer mixer component 206 are identical to the structure, size, and location of the same components in the first outer mixer component 202.

The perforations of the first outer mixer component 202 may be concentrically misaligned with perforations of the internal mixer component 204 and second outer mixer component 206. Additionally or alternatively, the perforations of the internal mixer component 204 may be concentrically misaligned with perforations of the second outer mixer component 206. As a result, a likelihood of exhaust gas mixing is increased.

In one example embodiment, exhaust gas flowing through an exhaust conduit has its flow altered by the first outer mixer component 202. The exhaust gas may flow into surfaces of the first outer mixer component 202 (e.g., the outer annulus 212 or the cone 216) and ricochet at various angles. The exhaust gas may also flow through the outer perforations 214, the inner perforations 218, and the flow space 217. Exhaust flowing through the outer perforations 214, the inner perforations 218, and the flow space 217 may have contacted surfaces of the first outer mixer component 202. Upstream of the internal mixer component 204, a first portion of exhaust gas flowing through the first outer mixer component 202 may collide and interact with a second portion of exhaust gas flowing through the first outer mixer component 202. Thus, a mixing of exhaust gas is increased.

Exhaust that has flowed through the first outer mixer component 202 flows toward and interacts with the internal mixer component 204. Exhaust flowing through the flow space 217 may have an increased likelihood of contacting one or more of the outer bevel 226 and the inner bevel 228. Exhaust flowing through the outer perforations 214 may have an increased likelihood of flowing into the outer bevel 226. Conversely, exhaust flowing through the inner perforations 218 may have an increased likelihood of flowing into the inner bevel 228.

Exhaust flows through the flow gap 232, the hole 230, peripheral perforations 236, and inner perforations 238 in order to flow to the second outer mixer component 206. The second outer mixer component 206 does a final perturbation of the exhaust gas before directing the exhaust flow to downstream components of the exhaust conduit 210.

Figure 5:
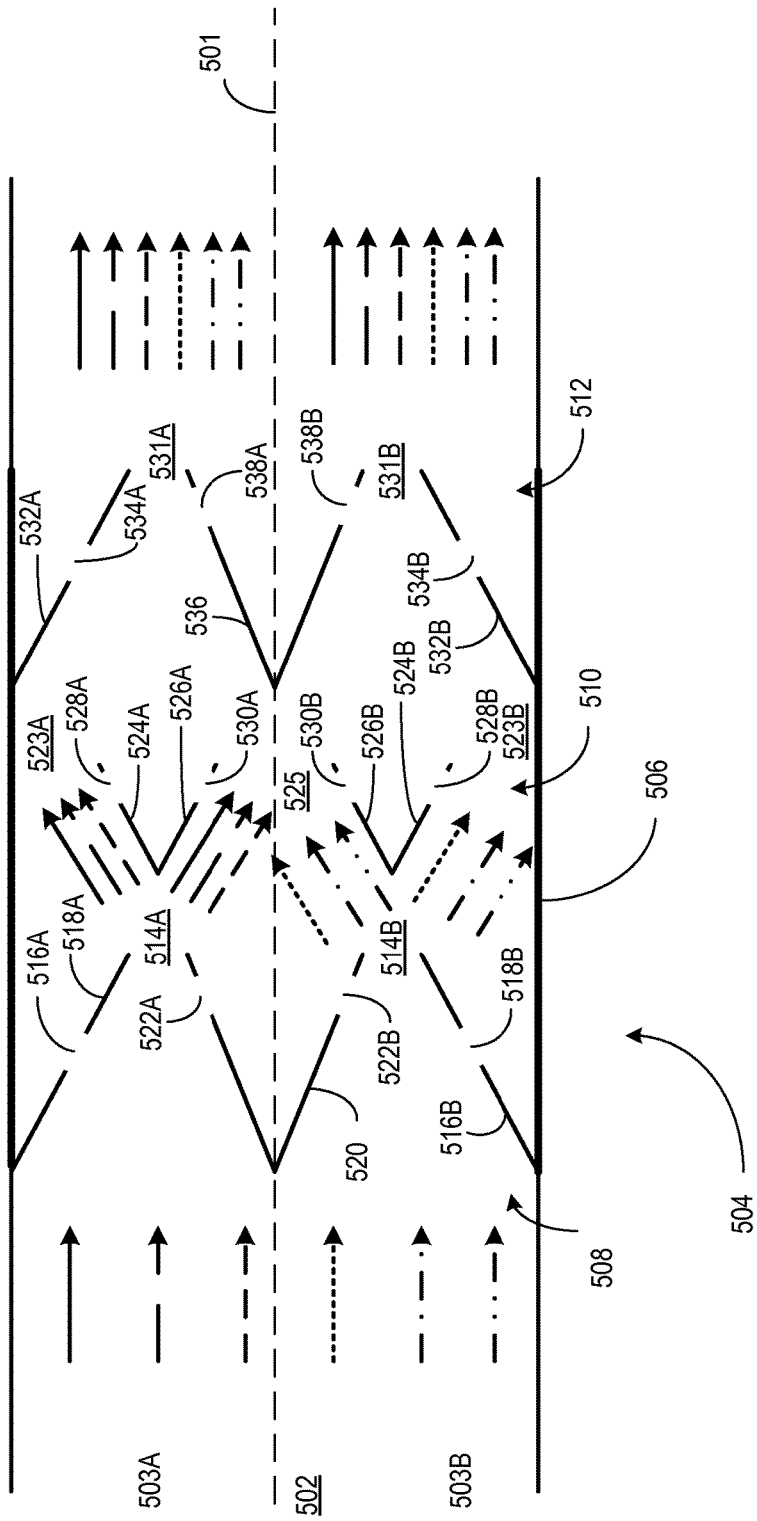
FIG. 5 illustrates an example exhaust air flow through the mixer.

FIG. 2 depicts a side on view of the mixer 201, while FIGS. 3A and 3B and 4A and 4B depict side-on and face-on views of first outer mixer component 202 and interior mixer component 204, respectively. FIG. 5 depicts an example flow of an exhaust gas interacting with a mixer. The mixer comprising three sections cascaded along an exhaust flow direction in an exhaust passage. A first and a second outer section include respective pluralities of perforations that are axially aligned along the exhaust flow direction, and where a middle section includes a plurality of perforations that are axially misaligned from the respective pluralities of perforations of the first and second outer sections.

Turning now to FIG. 5, a system 500 depicts an exhaust conduit 502 guiding exhaust gas towards an exhaust mixer 504. System 500 is illustrative by nature and represents one example exhaust flow through the exhaust mixer 504. It will be appreciated by someone skilled in the art that other exhaust flows through the mixer may be realized based on engine load, exhaust temperature, etc. For example, as exhaust temperature increases, mixing through the mixer 504 may be increased due to an increase velocity of exhaust flow.

In one embodiment, the exhaust mixer 504 of system 500 may be substantially similar to mixer 201 with reference to FIG. 2 and/or to mixer 68 with respect to FIG. 1. FIG. 5 is a side-on view of the mixer 504 and depicts an outline of a structure of the mixer 504 and its components. As shown, the mixer 504 has an anfractuous cross-sectional profile in order to increase mixing of compounds in an exhaust flow. Line 501 represents a center of the exhaust conduit 502, illustratively separating a top portion 503A from a bottom portion 503B of the exhaust conduit 502.

Exhaust conduit 502 (e.g., exhaust passage 48) comprises the exhaust mixer 504. The exhaust mixer 504 is physically coupled to the exhaust conduit 502 via a mixer pipe 506, as described above. The exhaust conduit 502 houses an entirety of the exhaust mixer 504 and the mixer pipe 506.

Exhaust gas flowing through the exhaust conduit 502 comprises various compounds. As depicted in FIG. 5, a first compound is represented by a solid line arrow, a second compound is represented by a large dash arrow, a third compound is represented by a medium dash arrow, a fourth compound is represented by a small dash arrow, a fifth compound is represented by a single dot arrow, and a sixth compound is represented by a double dot arrow. A medium dash is smaller than a large dash while being larger than a small dash. The various compounds in the exhaust gas may include one or more of oxygen, $CO_2$, soot, fuel, urea, $N_2$, etc. A direction of the components and the exhaust flow is indicated by the arrows.

Exhaust gas upstream of the mixer 504 is fairly heterogeneous. The six depicted components of the exhaust gas are separated. Upon reaching the exhaust mixer 504, the exhaust gas interacts with a first outer portion 508 (e.g., a first portion of outer mixer components 202) of the exhaust mixer 504. The exhaust gas interacts with and passes through various components of the first outer portion 508 before flowing to a middle portion 510.

The middle portion 510 also interacts with the exhaust gas and allows the exhaust gas to flow through its various orifices in order to flow downstream to a second outer portion 512. The second outer portion 512 interacts with exhaust gas substantially identically to the first outer portion 508. Exhaust gas passes through orifices of the second outer portion 512 and flows downstream to various instruments of the exhaust conduit 502. FIGS. 7, 8, and 9 depict embodiments of various instruments located downstream of the mixer 504. An example of exhaust flow through the mixer 504 with reference to specific components of the mixer 504 will be described below.

As exhaust begins to flow into the mixer 504, the first compound, second compound, and third compound are diverted to a top half 503A by a portion of an outer annulus 516A and a cone 520 of the first outer portion 508. The outer annulus 516A is concave while the cone 520 is convex. Therefore, exhaust gas in the top half 503A is guided toward upper aperture 514A. Likewise, the fourth compound, fifth compound, and sixth compound are diverted to a bottom half 503B by a portion of an outer annulus 516B and the cone 520. A tip of the cone 520 is located at a center of the exhaust conduit 502 and directs exhaust gas in the top half 503A toward aperture 514A and exhaust gas in the bottom half 503B toward aperture 514B.

As depicted, a slant (e.g., bevel) of the cone 520 in the top half 503A is angled to a slant (e.g., bevel) of the outer annulus 516A. Therefore, a portion of exhaust flowing toward the aperture 514A may collide with other portions of exhaust flowing toward the aperture 514A and begin to flow in various directions.

Similarly, a slant (e.g., bevel) of the cone 520 in the bottom half 503B is angled to a slant (e.g., bevel) of the outer annulus 516B. Therefore, a portion of the exhaust flowing toward the aperture 514B may collide with other portions of exhaust flowing toward the aperture 514B and begin to flow in various directions.

Although not depicted, a portion of exhaust gas may flow through outer perforations 518A and outer perforations 518B located in the top half 503A and the bottom half 503B, respectively. Exhaust gas flowing through the outer perforations 518A may flow angled to exhaust flowing through the aperture 514A. Likewise, exhaust gas flowing through the outer perforations 518B may flow angled to exhaust flowing through the aperture 514B.

Additionally, a portion of exhaust may flow through inner perforations 522A and inner perforations 522B located in the top half 503A and the bottom half 503B, respectively. Exhaust gas flowing through the inner perforations 522A may flow angled to exhaust flowing through the aperture 514A. Likewise, exhaust gas flowing through the inner perforations 522B may flow angled to exhaust flowing through the aperture 514B.

Exhaust flow may also collide with the mixer pipe 506 to further alter a flow direction of the exhaust gas. In this way, an exhaust flow may be isotropic and a likelihood of mixing is increased.

Exhaust flows through the openings of the first outer portion 508 (e.g., the inner perforations 522A and 522B and the apertures 514A and 514B) and flows into the middle portion 510. The middle portion 510 comprises outer bevels 524A and 524B and inner bevels 526A and 526B, located in the top half 503A and bottom half 503B. The outer bevel 524A is physically coupled to the inner bevel 526A in the top half 503A, directly downstream of the aperture 514A. The outer bevel 524A and inner bevel 526A are directed toward the aperture 514A at a point of contact between the outer bevel 524A and inner bevel 526A. The outer bevel 524B and inner bevel 526B are substantially identical to outer bevel 524A and inner bevel 526B, respectively. Therefore, a portion of the middle portion 510 in the top half 503A is substantially identical a portion of the middle portion 510 in the bottom half 503B.

A portion of the middle portion 510 within a boundary of the inner bevel 526A and 526B is concave, where the boundary spans a length from where the outer bevel 524A and the inner bevel 526A physically couple to where the outer bevel 524B and the inner bevel 526B physically coupled. Thus, exhaust gas flowing within the concave boundary may flow through one or more of inner bevel perforations 530A and 530B and a hole 525. In one example, the first compound, second compound, third compound, fourth compound, fifth compound, and sixth compound may all flow through the inner bevel perforations 530A and 530B and the hole 525. As directed by the first outer portion 508, the first compound, second compound, and third compound flow parallel to one another, opposed to/perpendicular to the fourth compound, fifth compound, and sixth compound.

A portion of the middle portion 510 between the mixer pipe 506 and the outer bevels 524A and 524B is convex. Exhaust gas flowing to the convex portion of the middle portion 510 in the top half 503A may flow through a gap 523A and outer bevel perforations 528A. Likewise, exhaust gas flowing to the convex portion of the middle portion 510 in the bottom half 503B may flow through a gap 523B and outer bevel perforations 528B.

In one example, exhaust flowing through either the gap 523A or the outer bevel perforations 528A may comprise the first, second, and third compounds and exhaust flowing through either the gap 523B and the outer bevel perforations 528B may comprise the fourth, fifth, and sixth compounds.

Exhaust flowing through the openings of the middle portion 510 (e.g., gaps 523A and 523B, outer bevel perforations 528A and 528B, inner bevel perforations 530A and 530B, and the hole 525) flows in the second outer portion 512.

The second outer portion 512 is substantially identical to the first outer portion 508. Portions of the outer annulus 532A and 532B, outer perforations 534A and 534B, orifices 531A and 531B, cone 536, and cone perforations 538A and 538B are substantially identical to corresponding components of the first outer portion 508. Exhaust flow may be redirected in a manner similar to that described for the first outer portion 508. As depicted in the example of FIG. 5, a portion of the first compound, second compound, third compound, fourth compound, fifth compound, and sixth compound is flowing through both the top half 503A and the bottom half 503B. In this way, exhaust flow downstream of the mixer 504 has a greater homogeneity than exhaust flow upstream of the mixer 504 by a factor of 2. Exhaust flowing through the second outer portion 512 flows toward various devices located downstream of the mixer 504.

In one embodiment, additionally or alternatively, the mixer 504 with the first outer portion 508, middle portion 510, and second outer portion 512 may adjust an exhaust flow in a manner substantially similar to a Galton box. In one example, flow through the mixer 504 may direct a majority of exhaust gas constituents/compounds toward the center of the exhaust conduit 502 (e.g., distribution of the exhaust constituents along the exhaust conduit may resemble a normal/binomial distribution downstream of the mixer 504). Thus, a mixing of an exhaust gas mixture is increased as a likelihood of flowing different constituents together along a central portion of the exhaust conduit 502 is increased.

FIG. 5 depicts an example flow of exhaust gas through a mixer located in an exhaust conduit. FIG. 6 illustrates a cross-section of an exhaust conduit and the mixer described above with respect to FIGS. 2 and 5.

Turning now to FIG. 6, a system 600 depicts a mixer 602 located within an exhaust conduit 604. In one embodiment, the mixer 602 of system 600 may be substantially similar to mixer 201 with reference to FIG. 2 and/or to mixer 68 with respect to FIG. 1. An outer mixer pipe has been omitted for reasons of clarity.

The mixer 602 comprises an upstream section 606, a central section 608, and a downstream section 610. The upstream section 606 and downstream section 610 are identical. The central section 608 is located between the upstream section 606 and the downstream section 610. The upstream section 606 is substantially identical to the first outer mixer component 202. The downstream section 608 is substantially identical to the internal mixer component 204. The downstream section 610 is substantially identical to the second outer mixer component 206.

The upstream section 606 and downstream section 610 each have a perforated annular plate angled downstream in an inward direction (e.g., concave). A perforated, upstream facing (e.g., convex) cone is vertically aligned with the annular plate in both the upstream and downstream sections 606 and 610. The central section 608 is between the upstream section 606 and the downstream section 610. The central section 608 has a perforated annular ring of triangular cross-section.

The upstream section 606, central section 608, and downstream section 610 are fully separated from each other, but are all coupled through a pipe in which the mixer 602 is fixed. The mixer 602 comprises free spaces between each of the upstream section 606, central section 608, and downstream section 610. The free spaces do not comprise other mixer elements and are occupied by empty space. The upstream section 606, central section 608, and downstream section 610 are aligned with and symmetrical about a central, longitudinal axis 601. The perforations of each of the upstream section 606, central section 608, and downstream section 610 are flow-through holes through which exhaust gas may flow.

Inner diameters of the annular plates of the upstream section 606 and the downstream section 610 align longitudinally with an outer diameter of the annular ring of the central section 608. For example, the inner diameter of the upstream section 606 may be determined by measuring a distance from an innermost portion of the annular plate and another corresponding innermost portion of the annular plate across the central axis 601. The outer diameter of the annular ring of the central section 608 may be determined via measuring a distance from a portion of the annular ring nearest to the exhaust pipe 604 to a corresponding portion of the annular ring nearest to an opposite portion of the exhaust pipe 604 across the central axis 601. In other words, an outer diameter is a greatest diameter of a corresponding component and an inner diameter is the smallest diameter of a corresponding component.

An outer diameter of each of the annular plates of the upstream and downstream sections 606 and 610 has a cylindrical outer wall coupled thereto and in face-sharing contact with an inner surface of a pipe in which the mixer is fixed. The outer diameters of each perforated annular plate of the upstream section 606 and the downstream section 610 is contiguous with an inner wall in which the mixer 602 is fixed. The perforated annular plate, of either the upstream section 606 or the downstream section 610, is coupled to a corresponding perforated upstream facing cone via one or more rods (e.g., 3 rods). A most upstream point of each of the upstream facing cones is at a central axis 601.

The inner diameter of the annular ring of the central section 608 aligns longitudinally with an outer diameter of each of the upstream facing cones of the upstream section 606 and downstream section 610. An outer diameter of the annular ring of the central section 608 is fully spaced away around an entire outer circumference from every point of the inner wall of the pipe in which the mixer 602 is fixed.

Arrows indicate a general direction of exhaust gas flow flowing through the exhaust conduit 604 and through various spaces and/or perforations of the mixer 602. As depicted, the portions of the mixer are staggered, similar to a Galton box. For example, exhaust flowing through an opening of the upstream section 606 has an increased likelihood of interacting with a surface of the central section 608. In general, the bevels and perforations of the upstream section 606, the central section 608, and the downstream section 610 decrease the likelihood for exhaust not to mix in the exhaust conduit 604.

Figure 10:
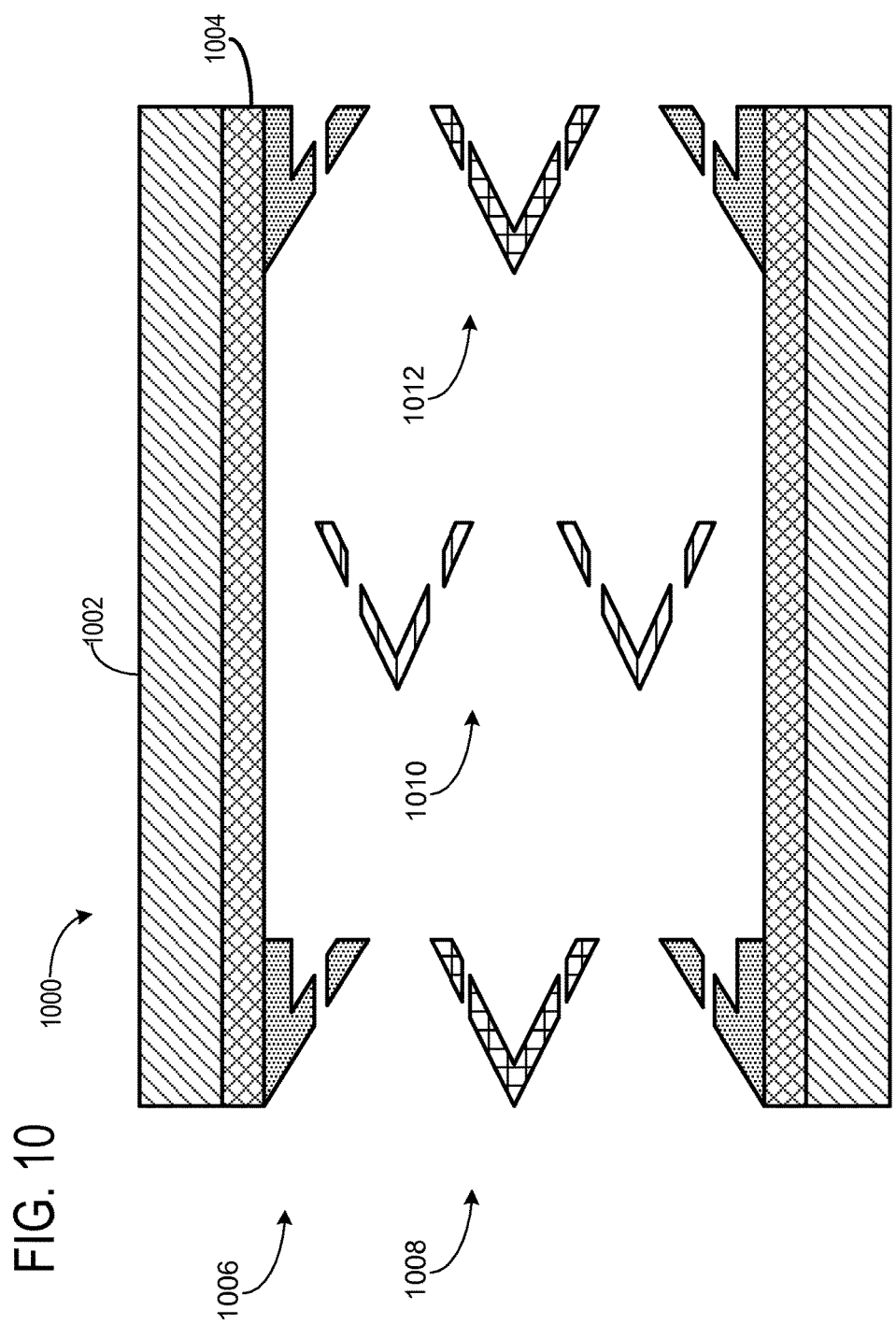
FIG. 10 illustrates a side-on view of the mixer in an exhaust conduit.

FIG. 6 depicts cross-sectional arrows illustrating a cross-section depicted in FIG. 10. FIG. 10 depicts a side-on cross-section further depicting a structure of a mixer. System 1000 includes an exhaust conduit 1002, a mixer pipe 1004, and an exhaust mixer 1006 comprising a first portion 1008, a second portion 1010, and a third portion 1012. The exhaust conduit 1002, the exhaust mixer 1006, the first portion 1008, the second portion 1010, and the third portion 1012 may be substantially identical to exhaust conduit 604, mixer 602, upstream section 606, central section 608, and downstream section 610 with respect to FIG. 6, respectively. In one embodiment, the mixer 1006 of system 1000 may be substantially similar to mixer 201 with reference to FIG. 2 and/or to mixer 68 with respect to FIG. 1.

As depicted, the first portion 1008, the second portion 1010, and the third portion 1012 do not comprise a base, as described above. For example, a cross-section of each of section is substantially similar to a chevron shape. Flow-through holes are located along portions of each section allowing exhaust to flow through. Exhaust flowing through the flow-through holes of either the first portion 1008, second portion 1010, and the third portion 1012 flows passes through the flow-through holes and enters a free space located directly downstream of any of the portions to continue flowing through the exhaust conduit 1002.

Turning now to FIG. 7, a system 700 depicts an embodiment of a mixer 706 downstream of a particulate filter 702 and upstream of a soot sensor 708. The soot sensor 708 may send signals to a controller (e.g., controller 12 of FIG. 1) in order to modify various engine actuators accordingly. For example, if a soot sensor detects a soot level being greater than a threshold soot level, then the controller 12 may reduce a torque output of a vehicle such that soot emissions are reduced. In one embodiment, the mixer 706 is equal to the mixer 68 used in the embodiment depicted with respect to FIG. 1.

Particulate filter 702 is upstream of mixer 706. As a result, exhaust flow received by the particulate filter 702 may be increasingly heterogeneous compared to exhaust gas flowing through a mixer (e.g., mixer 706), as described above. The particulate filter 702 releases the exhaust gas into a particulate filter outlet cone 704, upstream of the mixer 706. Exhaust flowing into the mixer 706 experiences a mixing substantially similar to mixing described with respect to FIG. 5. The exhaust downstream of the mixer 706 is increasingly homogenous compared to exhaust upstream of the mixer 706. Exhaust flow is analyzed by the soot sensor 708 in order to determine an amount of soot flowing through the particulate filter 702. Due to the location of the soot sensor, only a portion of the exhaust flow may be analyzed. The increase in homogeneity increases the accuracy of the soot sensor 708 reading.

Turning now to FIG. 8, a system 800 depicts an exhaust conduit 802 with a urea injector 804. The urea injector 804 is upstream of a mixer 806. The mixer 806 is upstream of a selective reduction catalyst (SCR) 808. In this way, the urea may mix with an exhaust gas such that an exhaust gas/urea mixture is more homogenous that it would be without flowing through the mixer 806. By increasing mixing of urea into the exhaust gas, urea coating surfaces of the SCR 808 may increase in uniformity and thereby increase efficiency. The system 800 may be used in the embodiment depicted with respect to FIG. 1. In such an example, the mixer 806 is substantially equal to the mixer 68 and the urea injector 804 is located downstream of the gas sensor 126 and upstream of the mixer 68. The SCR 808 is equal to or located within the emission control device 70.

Turning now to FIG. 9, a system 900 depicts an engine 902 fluidly coupled to an exhaust conduit 904. The engine 902 may be substantially similar to engine 10 of FIG. 1. The engine 902 expels exhaust gas into the exhaust conduit 904 after combusting. The exhaust gas flows through the exhaust conduit 904 before reaching a mixer 906. Exhaust gas is mixed in the mixer 906 before flowing to a gas sensor 908 downstream of the mixer. The gas sensor 908 may be substantially identical to gas sensor 126 of FIG. 1. In this way, the gas sensor 908 may for accurately measure an exhaust gas due to an increase in homogeneity. For example, if the gas sensor 908 is a UEGO sensor, then a more accurate air/fuel ratio may be measured compared to an air/fuel ratio measured by a UEGO sensor of an unmixed exhaust gas.

In this way, a compact, easy to manufacture mixer may be located upstream of a variety of exhaust system components in order to increase an accuracy of a sensor reading or improve efficacy of exhaust after-treatment devices. By staggering a first component, second component, and third component of the mixer and making perforations and gaps of each of the stages complementary to one another, a likelihood of mixing the exhaust gas is increased. Additionally, by manufacturing each component to be separate, a sturdiness of the mixer is increased such that as exhaust passes over the components of the mixer, the components do not vibrate and/or rattle. In this way, the mixer may be quieter that other mixers comprising longer components.

The technical effect of placing an exhaust mixer in an exhaust conduit is to improve an exhaust gas mixture homogeneity such that components downstream of the mixer may increase functionality.

An exhaust gas mixer comprising an upstream and downstream section, each having a perforated annular plate angled downstream in an inward direction and a perforated upstream facing cone vertically aligned with the annular plate. The mixer further comprising a central section between the upstream and downstream sections having a perforated annular ring of triangular cross-section. Inner diameters of the annular plates of the upstream and downstream sections align longitudinally with an outer diameter of the annular ring of the central section. An inner diameter of the annular ring of the central section aligns longitudinally with an outer diameter of each of the upstream facing cones of the upstream and downstream sections. The perforated annular plate is coupled to the perforated upstream facing cone via one or more rods.

The exhaust gas mixer further comprising, an outer diameter of each of the annular plates of the upstream and downstream sections has a cylindrical outer wall coupled thereto and in face-sharing contact with an inner surface of a pipe in which the mixer is fixed. The exhaust gas mixer where each section is fully separated from each other section other than coupling through a pipe in which the mixer is fixed. Spaced between each section in a longitudinal direction parallel to exhaust flow is free of any other mixer elements and occupied only by empty space. The outer diameter of the annular ring of the central section is fully spaced away around an entire outer circumference from every point on an inner wall of a pipe in which the mixer is fixed, and wherein each outer diameter of each perforated annular plate of the upstream and downstream sections is contiguous with the inner wall. The perforations are flow-through holes through which exhaust gas flows. An upstream-most point of each of the upstream facing cones is at a central longitudinal axis of a pipe in which the mixer is fixed. Each of the upstream, central, and downstream sections is aligned with, and symmetrical about, a central longitudinal axis An exhaust gas mixer, additionally or alternatively, comprising three sections cascaded along an exhaust flow direction in an exhaust passage and having a plurality of perforations, where respective perforations of adjacent sections are concentrically misaligned. The three sections include a first section and a third section comprising a convex protrusion attached to an outer annulus of the first section and a second section comprising an outer bevel and an inner bevel. The first section and third section further comprise perforations on their outer annuli and the convex protrusion, and wherein the second section comprises perforations on the outer bevel and the inner bevel. The perforations of the first, second, and third sections increase in size distal to a center of the exhaust passage.

The second section is located between the first section and the third section. The exhaust gas mixer is located downstream of a urea injector and upstream of a selective catalytic reduction device. Additionally or alternatively, the exhaust gas mixer is located upstream of one or more of an exhaust gas sensor and a soot sensor. The three sections exhibit an anfractuous cross-sectional profile. The exhaust gas mixer redirects exhaust flow such that an exhaust flow direction is isometric downstream of the exhaust gas mixer. The first section and third section are in face-sharing contact with an outer mixer pipe. The outer mixer pipe is physically coupled to an exhaust conduit.

An embodiment of an exhaust mixer, additionally or alternatively, comprises three sections cascaded along an exhaust flow direction in an exhaust passage, where a first and a second outer section include respective pluralities of perforations that are axially aligned along the exhaust flow direction, and where a middle section includes a plurality of perforations that are axially misaligned from the respective pluralities of apertures of the first and second outer sections. The first and the second outer section include an outer annulus and a cone, and where the cone is convex and the outer annulus is concave. A flow space separates the outer annulus and the cone, and wherein the flow space comprises three equally spaced legs physically coupled to the outer annulus and the cone.

The middle section of the exhaust gas mixer includes an outer bevel and inner bevel, and wherein the outer bevel and inner bevel adjoin at an upstream portion of the middle section while deviating away from one another at a downstream portion of the middle section. The inner bevel surrounds a hole of the middle section, and wherein the hole and inner bevel are concave. The first and second outer sections are in face-sharing contact with a mixer pipe and the second section is physically coupled to the mixer pipe via three equally spaced supports. The plurality of perforations of the first, second, and third sections are radially misaligned.

An exhaust gas conduit comprising a mixer pipe with three portions. A first portion and third portion comprise outer and inner perforations. The outer perforations are radially misaligned with the inner perforations. A second portion comprises peripheral and central perforations axially misaligned with the outer and inner perforations respectively and where the peripheral and central perforations are radially misaligned with one another. An exhaust gas flowing through the mixer pipe is perturbed in order to flow a first section of an exhaust gas flow into a second section of exhaust gas flow and vice-versa.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, layers laying in face-sharing contact with each other may be referred to as in face-sharing contact. As another example, elements positioned apart from each other with only a space therebetween and no other components in-between may be referred to as such, in at least one example. As still another example, areas identified as open space may be completely filled by only an open space, in at least some examples.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine exhaust gas passage; and
an exhaust gas mixer positioned in the passage having:
an upstream and a downstream section, each having a perforated annular plate angled downstream in an inward direction and a perforated upstream facing cone vertically aligned with the annular plate; and
a central section between the upstream and downstream sections having a perforated annular ring of triangular cross-section.

2. The system of claim 1, wherein inner diameters of the annular plates of the upstream and downstream sections align longitudinally with an outer diameter of the annular ring of the central section.

3. The system of claim 1, wherein an inner diameter of the annular ring of the central section aligns longitudinally with an outer diameter of each of the upstream facing cones of the upstream and downstream sections.

4. The system of claim 1, wherein the perforated annular plate is coupled to the perforated upstream facing cone via one or more rods.

5. The system of claim 1, wherein an outer diameter of each of the annular plates of the upstream and downstream sections has a cylindrical outer wall coupled thereto and in face-sharing contact with an inner surface of a pipe in which the exhaust gas mixer is fixed.

6. The system of claim 1, wherein each section is fully separated from each other section other than coupling through a pipe in which the exhaust gas mixer is fixed.

7. The system of claim 1, wherein space between each section in a longitudinal direction parallel to exhaust flow is free of any other mixer elements and occupied only by empty space.

8. The system of claim 1, wherein an outer diameter of the annular ring of the central section is fully spaced away around an entire outer circumference from every point on an inner wall of a pipe in which the exhaust gas mixer is fixed, and wherein each outer diameter of each perforated annular plate of the upstream and downstream sections is contiguous with the inner wall.

9. The system of claim 1, wherein perforations of each of the upstream and downstream sections and the central section are flow-through holes through which exhaust gas flows.

10. The system of claim 1, wherein an upstream-most point of each of the upstream facing cones is at a central longitudinal axis of a pipe in which the exhaust gas mixer is fixed.

11. The system of claim 1, wherein each of the upstream, central, and downstream sections is aligned with, and symmetrical about, a central longitudinal axis.

12. A system, comprising:
an engine exhaust gas passage; and
an exhaust gas mixer positioned in the engine exhaust gas passage, comprising:
three sections cascaded along an exhaust flow direction in the engine exhaust gas passage, where a first and a second outer section include respective pluralities of perforations that are axially aligned along the exhaust flow direction, and where a middle section includes a plurality of perforations that are axially misaligned from the respective pluralities of perforations of the first and second outer sections, and where the first and second outer sections are in face-sharing contact with a mixer pipe and the middle section is physically coupled to the mixer pipe via three equally spaced supports.

13. The system of claim 12, wherein the first outer section and the second outer section include an outer annulus and a cone, and where the cone is convex and the outer annulus is concave.

14. The system of claim 13, wherein a flow space separates the outer annulus and the cone, and wherein the flow space comprises three equally spaced legs physically coupled to the outer annulus and the cone.

15. The system of claim 12, wherein the middle section includes an outer bevel and an inner bevel, and wherein the outer bevel and the inner bevel adjoin at an upstream portion of the middle section while deviating away from one another at a downstream portion of the middle section.

16. The system of claim 15, wherein the inner bevel surrounds a hole of the middle section, and wherein the hole and the inner bevel are concave.

17. An engine exhaust system, comprising:
an exhaust mixer pipe with three portions;
a first portion and a third portion comprising outer and inner perforations on an outer annulus and a central cone;
the outer perforations radially misaligned with the inner perforations; and
a second portion comprising peripheral and central perforations axially misaligned with the outer and inner perforations respectively;
the peripheral and central perforations radially misaligned with one another.

18. The system of claim 1, wherein the central section has a V-shaped cross-section with bevels coming together so that a point of the V faces upstream and an opening of the V faces downstream.

* * * * *